United States Patent
Fulterer

[11] Patent Number: 6,007,248
[45] Date of Patent: Dec. 28, 1999

[54] DEVICE FOR DRAWING OUT HEAVY LOADS

[75] Inventor: Manfred Fulterer, Lustenau, Austria

[73] Assignee: Fulterer Gesellschaft m.b.H., Lustenau, Austria

[21] Appl. No.: 08/984,435

[22] Filed: Dec. 3, 1997

[30] Foreign Application Priority Data

Dec. 4, 1996 [AT] Austria ..................... 2109/96

[51] Int. Cl.⁶ ..................................... F16C 29/04
[52] U.S. Cl. ................................. 384/53; 384/58
[58] Field of Search .................. 384/19, 23, 50, 384/53, 55, 58; 212/346, 350; 414/522

[56] References Cited

U.S. PATENT DOCUMENTS

| 1,611,326 | 12/1926 | Abbe | 212/350 |
| 2,444,432 | 7/1948 | Eckert | 384/53 |
| 2,643,162 | 6/1953 | Barr | 384/58 |
| 4,798,149 | 1/1989 | Hoffmann | 384/58 X |
| 4,950,123 | 8/1990 | Brockhaus | 414/522 |
| 5,026,176 | 6/1991 | Jensen et al. | 384/53 |

FOREIGN PATENT DOCUMENTS 0314176  5/1989  European Pat. Off. .

*Primary Examiner*—Thomas R. Hannon
*Attorney, Agent, or Firm*—Brown & Wood, LLP

[57] ABSTRACT

A device for drawing out heavy loads including at least one drawing-out rail having a I-shaped cross-section and a vertical central plane of symmetry, running rollers provided on opposite sides of the drawing-out rail, and a pair of stationary rails or a pair of rails at least partially displaceable in a longitudinal direction, the rails of the pair of rails being arranged on opposite sides of the drawing-out rail for supporting the running rollers, with flanges of the rails forming tracks for the running rollers, and with the stationary rails, the drawing-out rail, and the partially displaceable rails being all formed of rolled steel sections.

22 Claims, 8 Drawing Sheets

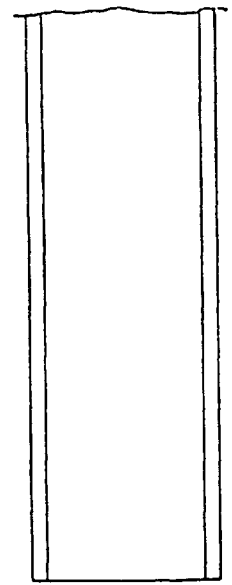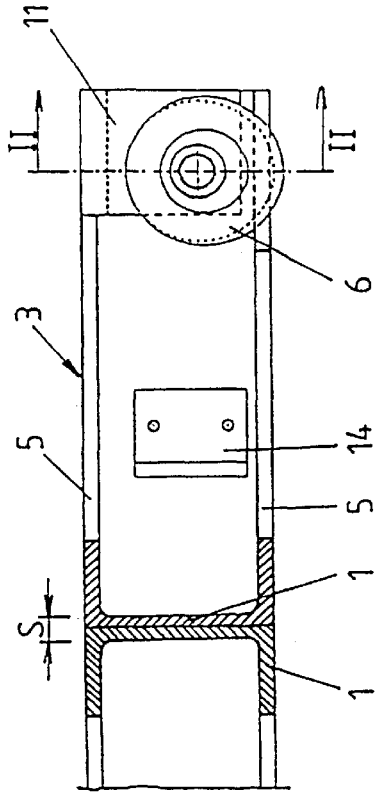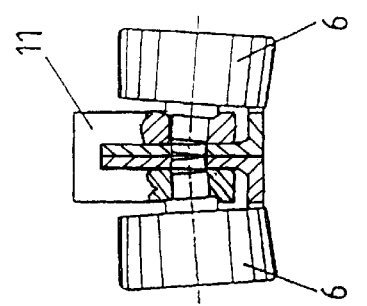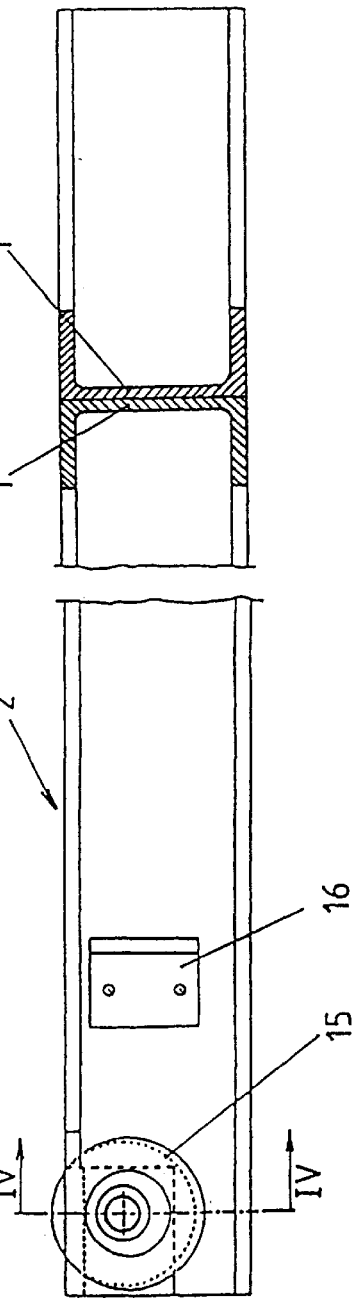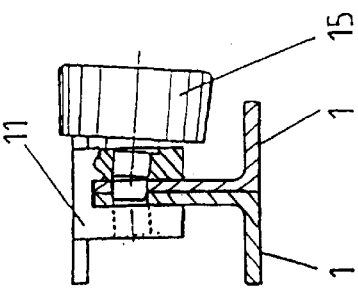

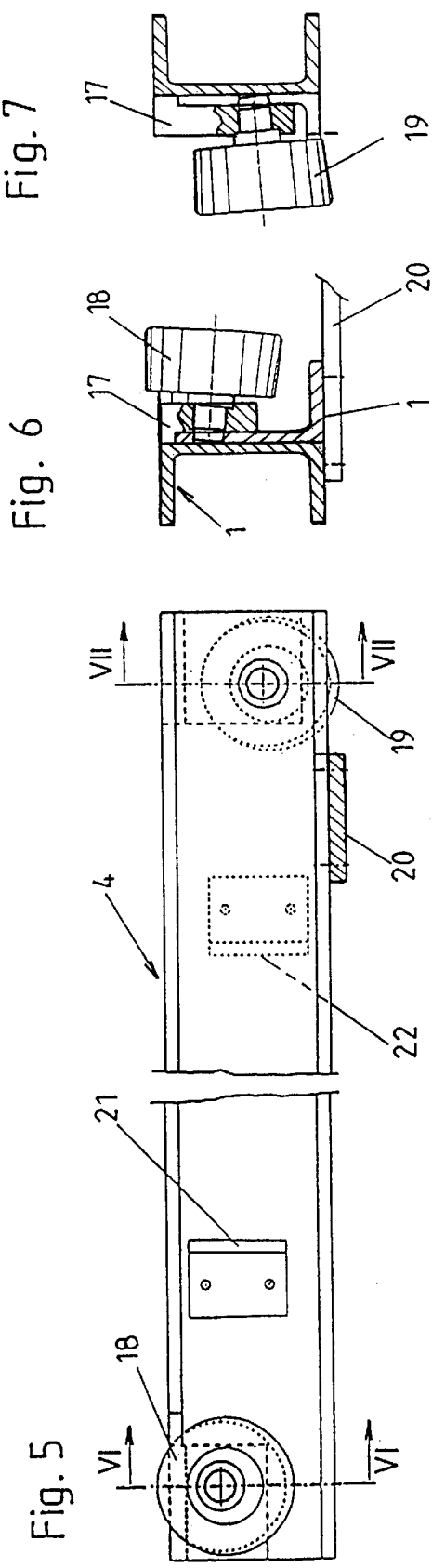
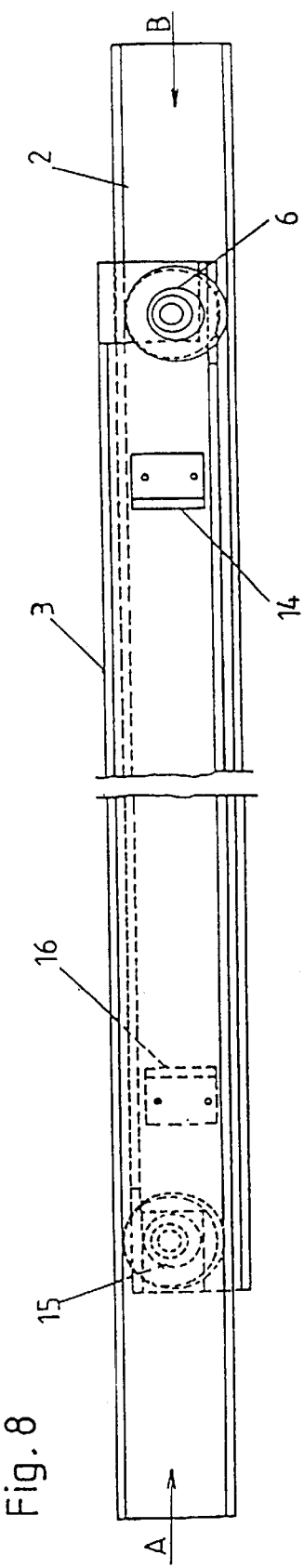

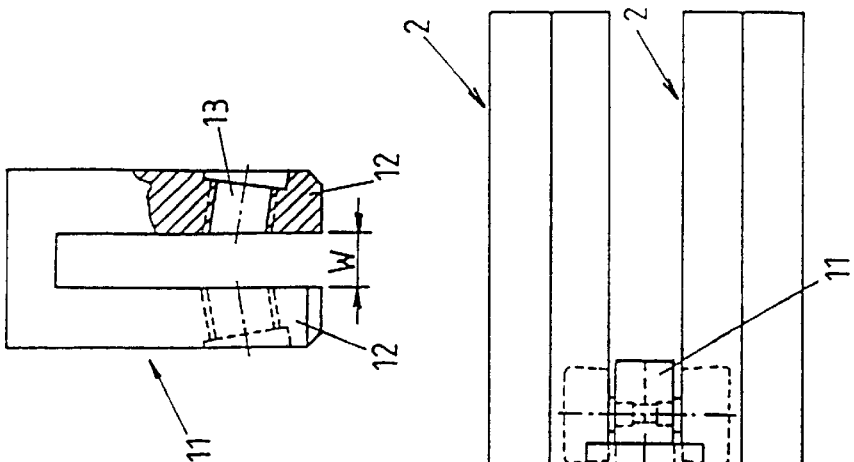
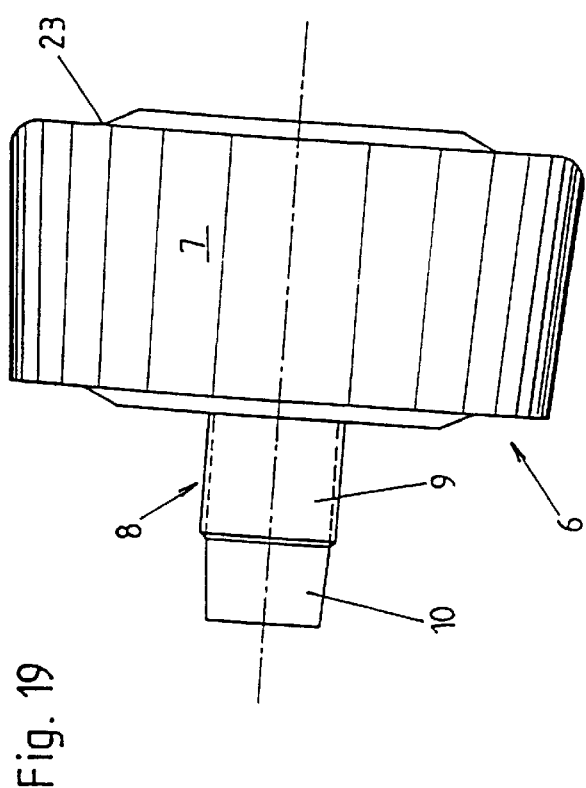
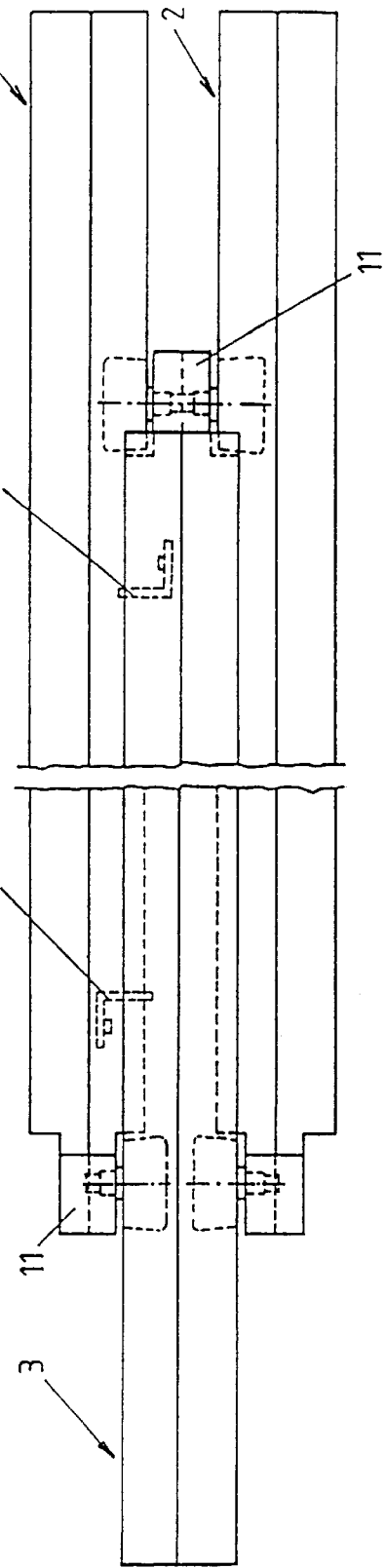

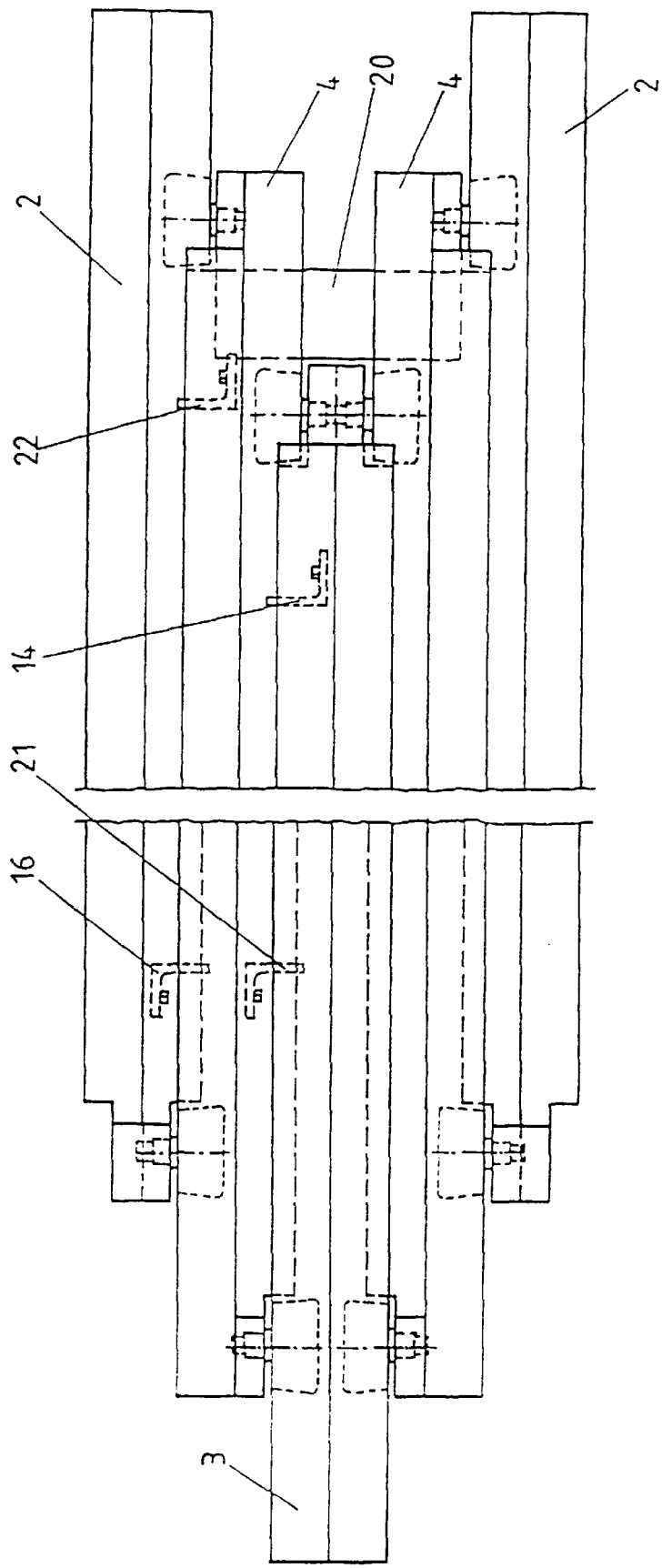

6,007,248

1

DEVICE FOR DRAWING OUT HEAVY LOADS

BACKGROUND OF THE INVENTION

1. Field of the Invention

The present invention relates to a drawing-out device including at least one drawing-out rail, and at least two stationary rails, with running or support rollers being supported at front in a drawing direction, and/or rear, with respect to the drawing direction, end portions of respective rails.

2. Description of the Prior Art

In many cases, it is desirable to have a possibility to displace horizontally heavy loads. E.g., fire-engines carry heavy motor pumps which should be unloaded and properly positioned. The heavy elements or loads need be taken off from the fire-engine and positioned on the ground. Conventional drawing-out devices with rails formed of sheet metal strips cannot perform this task.

Accordingly, an object of the present invention is to provide a device capable of withdrawing out heavy loads and which would have, at the same time, relatively small dimensions.

SUMMARY OF THE INVENTION

This and other objects of the present invention, which will become apparent hereinafter are achieved by forming the load-carrying drawing-out rail as an I-shaped rail having a vertical central plane of symmetry and by forming all rails of the device of rolled steel sections. The present invention permits to adapt the inventive drawing-out device to different tasks and to provide modular components of which a device can be formed in accordance with a task it has to perform.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 shows a partially cross-sectional side elevational view of a drawing-out rail of a device for drawing out heavy loads according to the present invention;

FIG. 2 shows a cross-sectional view along the line II—II in FIG. 1;

FIG. 3 shows a partially cross-sectional side elevational view of a stationary rail of a device for drawing out heavy loads according to the present invention;

FIG. 4 shows a cross-sectional view along line IV—IV in FIG. 3;

FIG. 5 shows an elevational view of intermediate rail of a device for drawing out heavy loads in a completely drawn-out position;

FIG. 6 shows a cross-sectional view along line VI—VI in FIG. 5;

FIG. 7 shows a cross-sectional view along line VII—VII in FIG. 5;

FIG. 8 shows a side elevational view of a simplified version of a device for drawing out heavy loads formed of rails shown in FIGS. 1 and 3;

2

Figure 9:
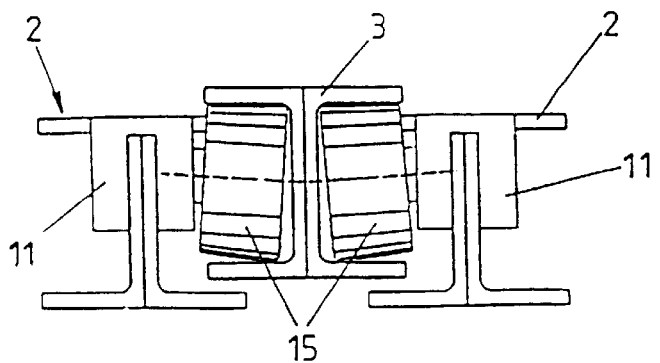
FIG. 9 shows a front view (in a direction of arrow A in FIG. 8) of the device shown in FIG. 8.
Figure 10:
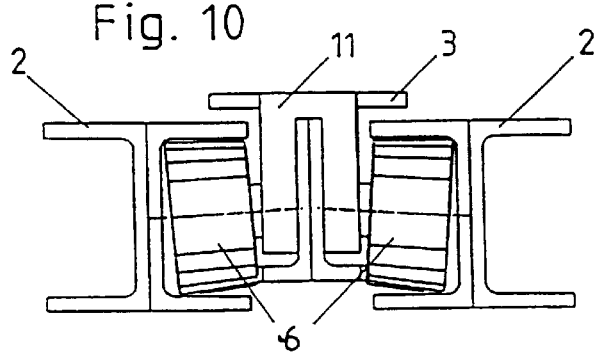
Figure 11:
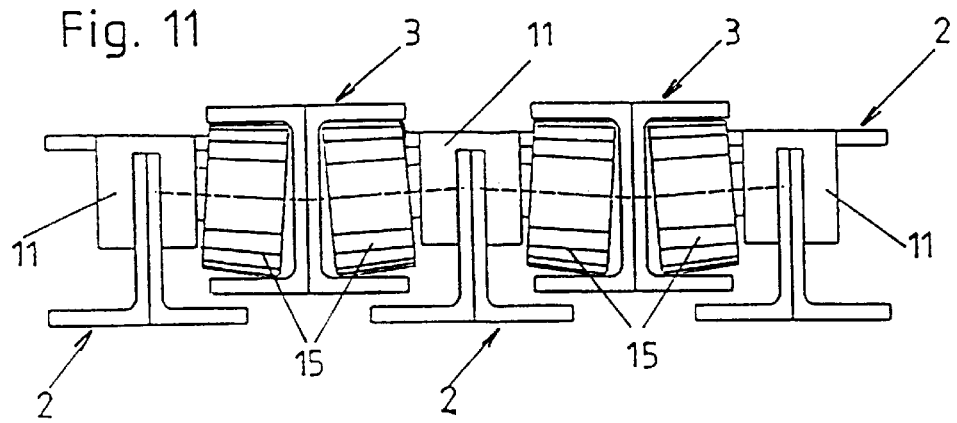
Figure 12:
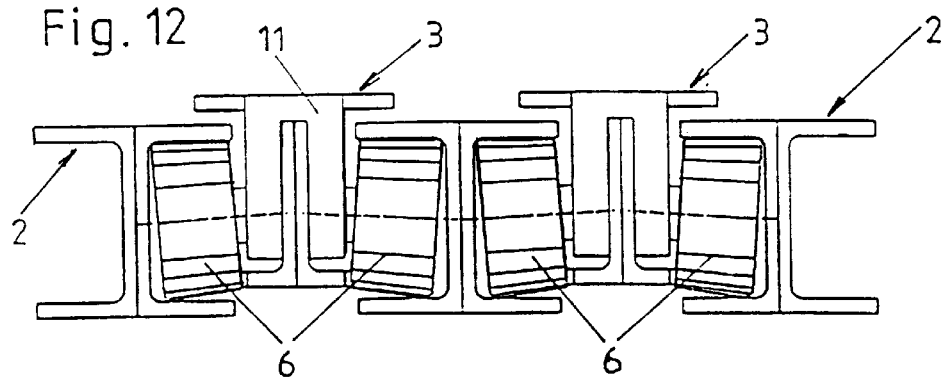
Figure 13:
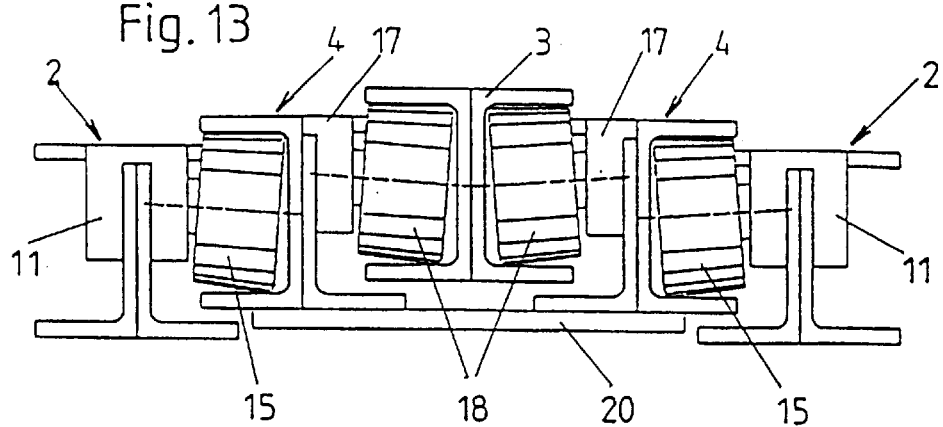
Figure 14:
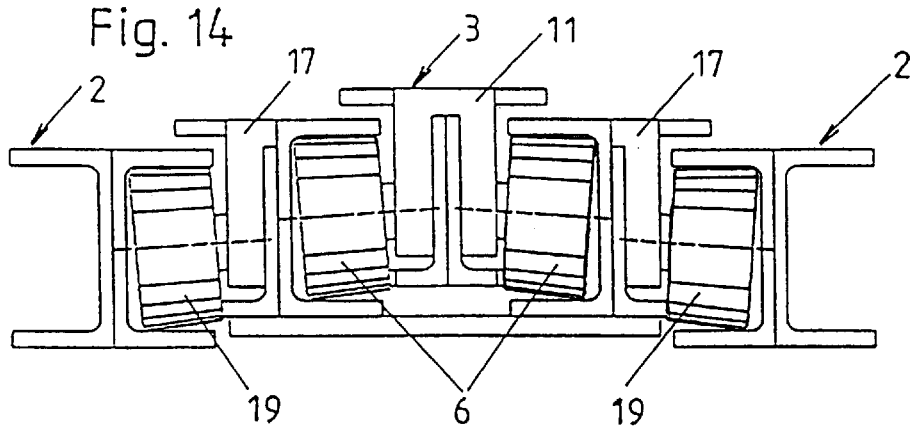
Figure 15:
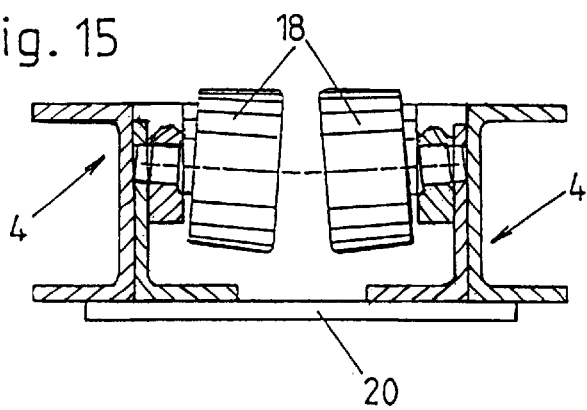
Figure 16:
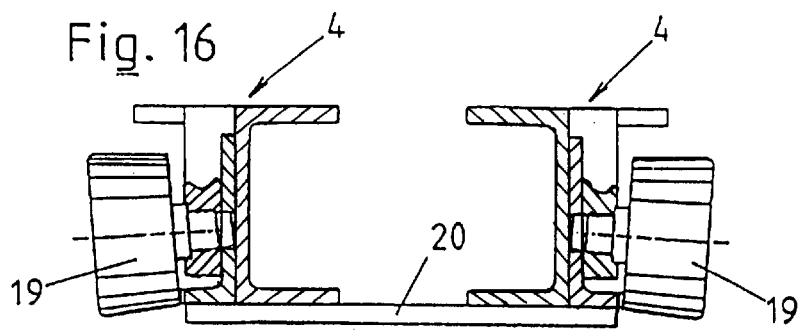
Figure 17:
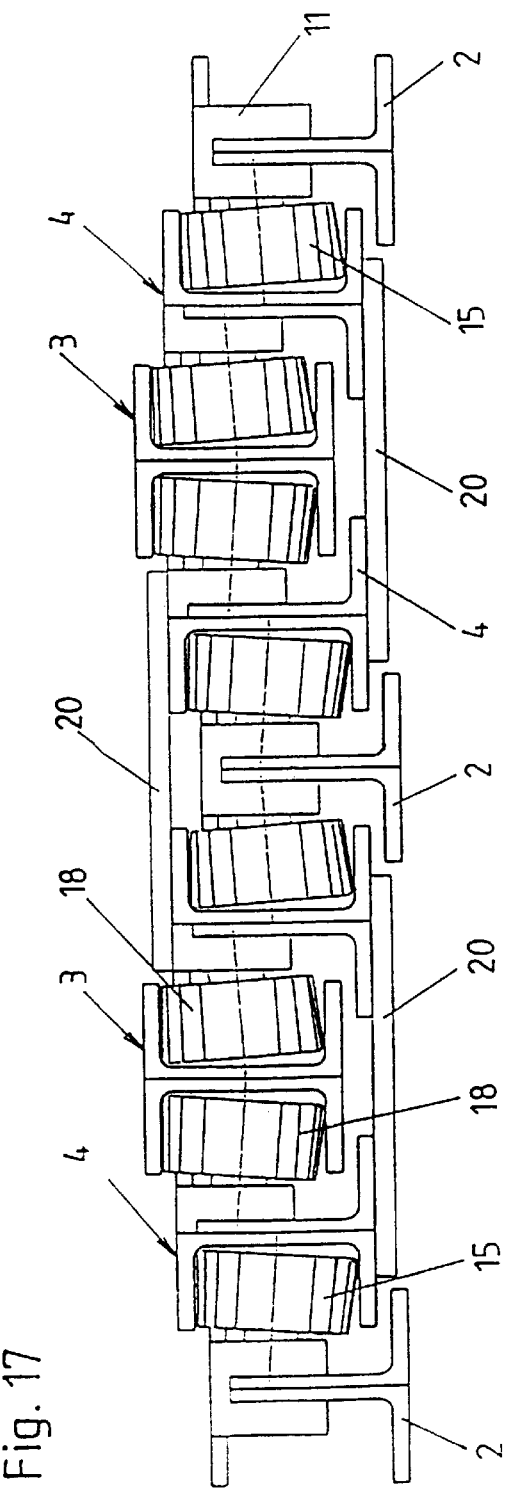
Figure 18:
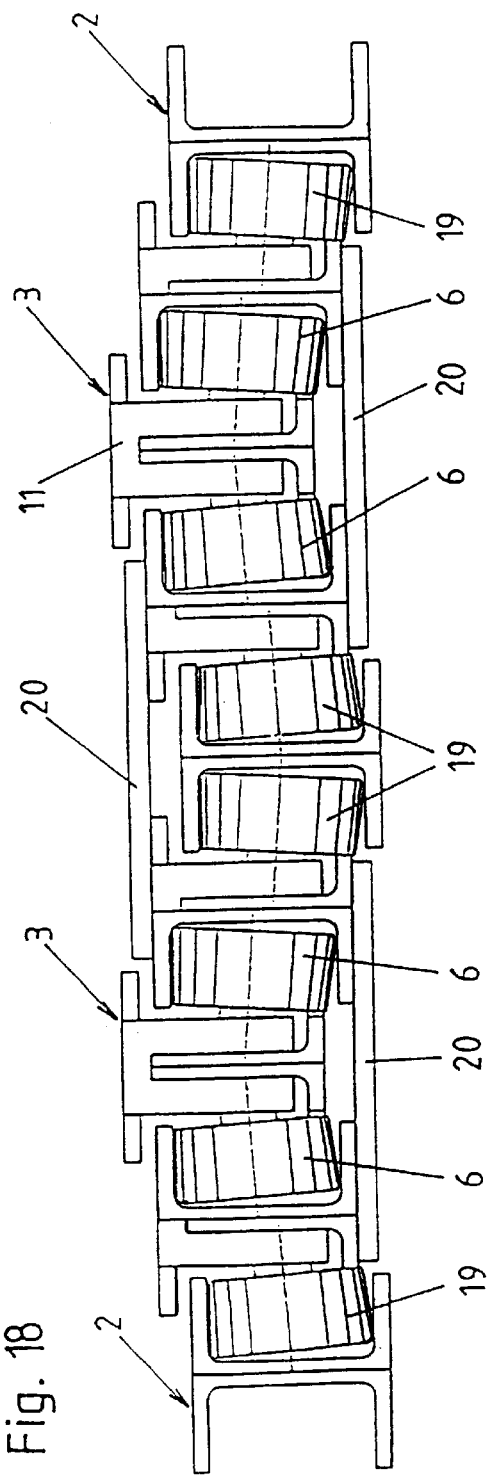
Figure 23:
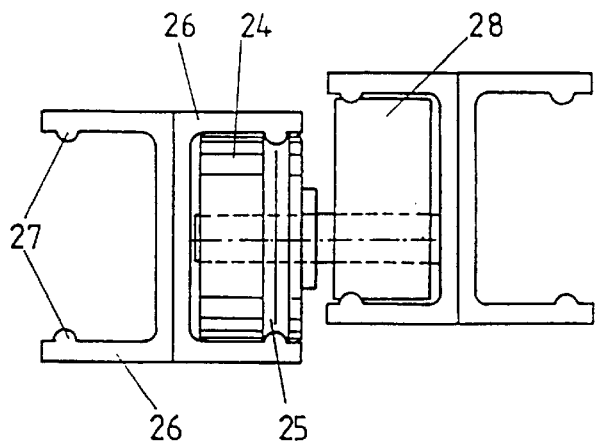
Figure 25:
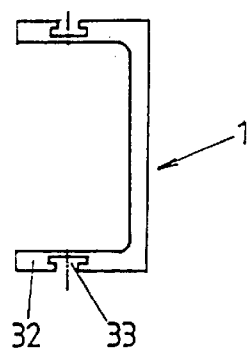
Figure 24:
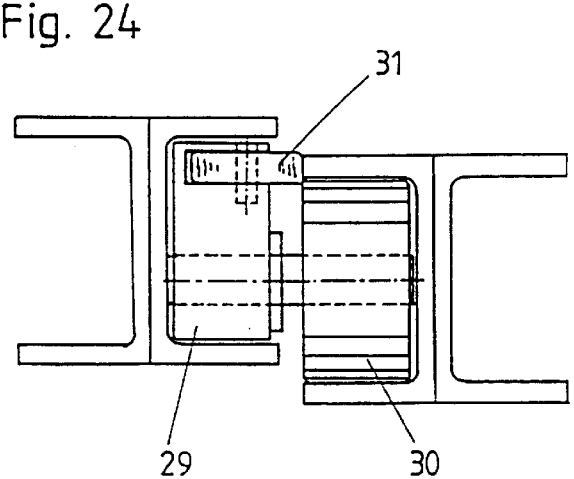
Figure 26:
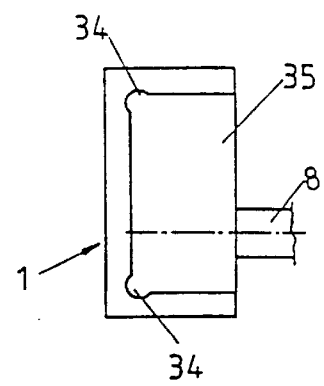
Figure 27:
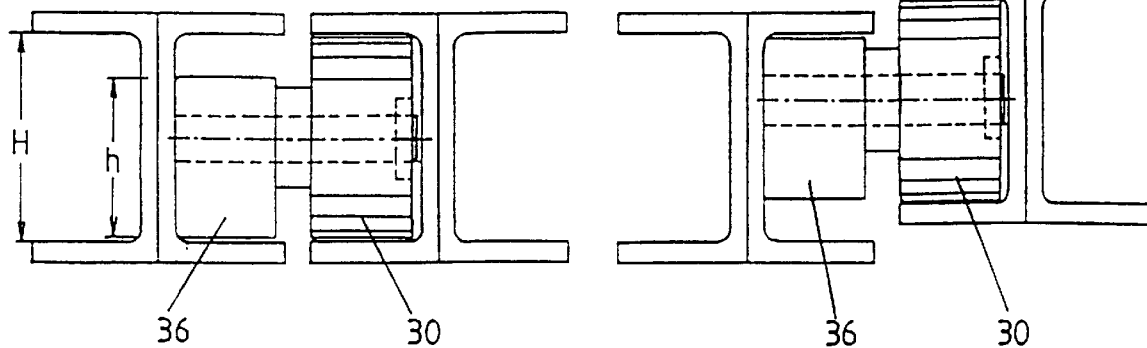
Figure 28:
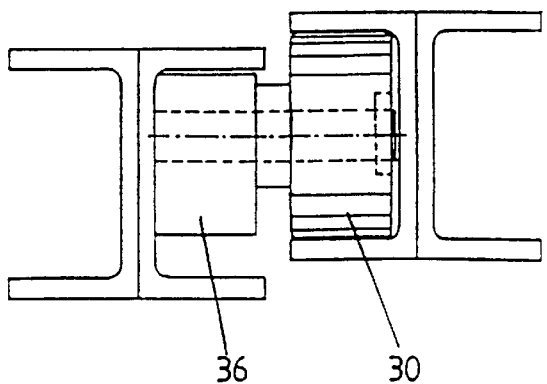

FIG. 10 shows a rear view (in a direction of arrow B in FIG. 8) of the device shown in FIG. 8;

FIG. 11 shows a front view of a twin version of the device shown in FIGS. 8, 9 and 10;

FIG. 12 shows a rear view of a twin version of the device shown in FIGS. 8, 9 and 10;

FIG. 13 shows a front view of a device for drawing out heavy loads formed of drawing-out, stationary and intermediate rails;

FIG. 14 shows a rear view of the device shown in FIG. 13;

FIG. 15 shows a partially cross-sectional front view of the intermediate rail of the device shown in FIGS. 13;

FIG. 16 shows a partially cross-sectional rear view of the intermediate rails of the device shown in FIGS. 13–14;

FIG. 17 shows a front view of a twin version of the device shown in FIGS. 13–14;

FIG. 18 shows a rear view of a twin version of the device shown in FIGS. 13–14;

FIG. 19 shows, at an increased scale, a side view of a running or support roller with a conical running surface of device for drawing out heavy loads according to the present invention;

FIG. 20 shows a top view of the device shown in FIGS. 8, 9 and 10 in a partially drawn-out position;

FIG. 21 shows a top view of the device shown in FIGS. 13–14 in a partially drawn-out position;

FIG. 22 shows a partially cross-sectional view of a U-shaped bearing block of a device for drawing out heavy loads according to the present invention;

FIG. 23 shows a view illustrating support for a running roller with a cylindrical running surface with grooves formed therein;

FIG. 24 shows a view illustrating support for a running roller with a smooth cylindrical running surface;

FIG. 25 shows an elevational view of a U-shaped profile of which the rails of a drawing-out device according to the present invention is made;

FIG. 26 shows an elevational view of another U-shaped profile of which the stationary rail of a drawing-out device according to the present invention is made;

FIG. 27 shows an elevational view illustrating a position of bearing block of a drawing-out device according to the present invention; and FIG. 28 shows an elevational view illustrating another-possible position of bearing block of a drawing-out device according to the present invention

DETAILED DESCRIPTION OF THE PREFERRED EMBODIMENT

A device for drawing out heavy loads according to the present invention is formed of a rolled steel and particular of a U-shaped rolled steel sections 1 which are used for forming a stationary rail 2, a drawing-out rail 3, and an intermediate rail 4, which are formed by pairs of U-shaped sections having their web portions abutting each other. FIG. 1 shows the drawing-out rail 3 which is formed in this way. The flanges 5 are used as tracks for running rollers 6. The running rollers 6 used in this embodiment have, as shown in FIG. 19, a conical running surface 7, with a cone angle of about 10°. Axle journals 8 of the running rollers 6 have two sections, a first threaded cylindrical section 9, and a second conical section 10, which is formed as a cone stub with a cone angle also of about 10°. For securing the running rollers 6 on the drawing-out rail 3, there is provided a bearing block 11 having a U-shaped cross-section. The bearing block 11, which is shown in FIG. 22, has threaded bores 13 formed in the two legs 12 thereof. The internal width W of the U-shaped bearing block 11 correspond to the thickness S of the two, abutting each other, webs of the U-shaped sections 1. In the rear region of the drawing-out rail 3, where the track flanges 5 are provided, the bearing block 11 is mounted on the web from above. The vertically extending webs have bores, which are aligned with the bores 13 formed in the legs 12 of the bearing block 11, for receiving the second, conical sections 10 of the axle journals 8 of the running rollers 6. The axis of the web bores extend perpendicular to the web plane. In front of a running roller 6, there is provided, in one of the webs, a stop 14 which limits the drawing-out path of the device. For forming the drawing-out rail, the preliminary cut-out sections of the U-shaped profile are assembled with their webs abutting each other, then the bearing block 11 is mounted on the abutting each other webs, and then the axle journals 8 of the running rollers 6 are screwed in, with the second, conical sections 10 of the axle journals 8 extending into the bores formed in the webs of the arranged back-to-back U-shaped sections, securing the bearing block 11 on the rail.

The stationary rail 2, which is shown in FIG. 3, is likewise formed of U-shaped sections of rolled steel. The running or support rollers 15 are mounted on this rail in the front portion thereof. As in the drawing-out rail 3, the stationary rail 2 likewise includes a bearing block 11 for mounting the running or support rollers 15. On the web of one of the U-shaped rolled sections, there is provided a stop 16 which cooperates with the stop 14 provided on the drawing-out rail 3.

A simplified version of a drawing-out device according to the present invention is formed only of the drawing-out rail 3 and the stationary rail 2. Such a simplified drawing-out out device is shown in FIGS. 8–10 and 20. The simplified version of the inventive drawing-out device permits to use a twin arrangement of this device, with the devices, each of which is formed of only stationary 2 and drawing-out 3 rails, being mounted, as shown in FIGS. 11–12, back-to-back. In the twin arrangement, there are provided two drawing-out rail 3 and three stationary rail 2. This arrangement can be easily duplicated, with respective stationary and drawing-out rails being provided on one or both sides of the arrangement.

If the drawing-out device should be formed for a complete withdrawal, then an intermediate rail 4 becomes necessary. Each intermediate rail 4, which is shown in FIG. 5, is likewise formed of paired U-shaped sections, with their webs abutting each other. The running rollers 18, 19 are mounted on the rail 4 with a simplified bearing block 17. The running rollers 18, 19 are mounted in the front and rear portions of the rail 4. The bearing block 17, like the bearing block 11, is provided with threaded bores for receiving the axle journals of the running and support rollers 18 and 19. The bearing block 17 is formed substantially as a simple stone which is mounted on a web of one of the U-shaped sections. For a twin arrangement, the intermediate rails 4 are connected with each other by a transverse bar 20, as shown in FIGS. 15–16.

A drawing-out device according to the present invention designed for a complete withdrawal of a load is shown in FIGS. 13, 14 an 21. In this device, there are further provided two additional stops 21 and 22 secured on the vertical webs of the intermediate rails 4. the complete withdrawal devices can also be formed in a twin or multiple version, as shown in FIGS. 17–18. At that, the transverse bars 20, which connect the intermediate rails 4, are alternatively located above and below the intermediate rails 4.

In all of the embodiments of a drawing-out device according to the present invention, the running rollers have conical running surfaces 7 and the axles of which extend at an angle. The end surfaces 23 of these rollers form with respective web of the associated rails acute angles.

It is within the scope of the invention, that the running rollers with a cylindrical running surfaces can be used. To provide for side guidance of these rollers, they are provided, as can be seen in FIG. 23, a with cylindrical running surface 24 having one or more grooves 25 which form-lockingly engage bars 27 provided on cheeks 26 of the U-shaped sections. A bearing block 28, which is used for mounting rollers with a cylindrical running surface, can be provided, on its upper or lower side, likewise with grooves in which the bars 27 form-lockingly engage for positioning of the bearing block 28. Instead of running rollers having a grooved cylindrical running surface 24, running rollers with a smooth cylindrical running surface can be used. Such rollers 30 are shown in FIG. 24. When such running rollers are used, respective bearing blocks 29 are provided with guide rollers 31, which freely rotate about a vertical axis. The guide roller 31, in this case, rolls over a side edge of a flange of an adjacent U-shaped rail, as shown in FIG. 24. The guide roll 31 can be mounted above or below the axle of a respective running or support roller. For securing of the rails on a body or for securing a load on the rails, T-shaped grooves 33 can be formed on the outer sides of cheeks 32 of U-shaped sections, as shown in FIG. 25.

A version of form-locking support for a bearing block is shown in FIG. 26. Here, grooves 34 are formed in the transitional regions between the checks and the web of a U-shaped section. The bearing block 35 is provided with bead-shaped edges corresponding to the shape of the grooves and which form-lockingly engage in the grooves 34.

It should be further mentioned that it can have a height h smaller than the height H of the U-shaped section 1, with the bore for receiving an axle journal of a running roller 30 being located eccentrically with respect to the middle of the height h. The bearing block 35 can so be arranged in the U-shaped section that the axis of the axle journal-receiving bore is located in the middle of the height of the U-shaped section, as shown in FIG. 27, or it can be located in offset relationship with respect to the middle of the height H of the U-shaped section, as shown in FIG. 28. Thereby it is possible to so arrange adjacent rails that their flanges or checks are arranged flush with respect to each other or are vertically offset relative to each other, as shown in FIGS. 27 and 28, respectively.

FIGS. 9 and 10 show an element of the inventive drawing-out device which, as a rule, is used in a twin arrangement. In the disclosed embodiments, the upper flanges of the drawing-out rail 3 have a highest position in comparison with upper flanges of adjacent rails. However, an arrangement of rails is possible in which the drawing-out rail stays on its head, so to say, as shown in FIGS. 9–12, i.e., it is pivoted with respect to an axis perpendicular to the plain of the drawing by 180°, so that the intermediate rail is higher than the drawing-out rail. Instead of the I-shaped profile, which is formed of a pair of U-shaped sections having their webs abutting each other, a rolled I-shaped sections can be used for forming the rails.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit ad scope of the appended claims.

What is claimed is:

1. A device for drawing-out heavy loads, comprising
   at least one drawing-out rail having a I-shaped cross-section and a vertical central plane of symmetry;
   running rollers provided on opposite sides of the drawing-out rail; and
   at least one of a pair of stationary rails and a pair of rails at least partially displaceable in a longitudinal direction, the rails of the at least one of a pair of stationary rails and a pair of partially displaceable rails being arranged on opposite sides of the drawing-out rail for supporting the running rollers, and flanges of the rails of the at least one of a pair of stationary rails and a pair of at least partially displaceable rails forming tracks for the running rollers,
   wherein the stationary rails, the drawing-out rail, and the at least partially displaceable rails are all formed of rolled steel sections.

2. A drawing-out device as set forth in claim 1, wherein the running rollers have a conical running surface.

3. A drawing-out device as set forth in claim 2, wherein horizontal flanges have a cut-out in regions of the running rollers.

4. A drawing-out device as set forth in claim 2, wherein the running rollers have a basic diameter corresponding to an inner width between flanges of the I-shaped drawing-out rail.

5. A drawing-out device as set forth in claim 2, wherein the conical running surface has a cone angle of about 10°.

6. A drawing-our device as set forth in claim 5, wherein each of the running rollers has an axle journal formed of two sections, a first cylindrical section having a thread and located adjacent to the roller, and a second section remote from the roller and formed as a conical stub.

7. A drawing out device, as set forth in claim 6, wherein the conical stub has a cone angle of about 10°.

8. A drawing-out device s set forth in claim 6, wherein the device further comprises bearing blocks for mounting the running rollers on respective rails, the bearing blocks having bores for receiving the axle journals of respective running rollers, with axes of the bores being inclined with respect to outer surfaces of the bearing blocks in a downward direction.

9. A drawing-out device as set forth in claim 8, wherein the axes of the bores are inclined at an angle of about 5°.

10. A drawing-out device as set forth in claim 8, wherein vertical webs of the rails are provided with bores congruent with respective bores of the baring blocks for receiving the conical stubs of the axle journals of respective running rollers, the bores provided in the vertical webs of the rails having axes thereof extending perpendicular to planes of the respective webs.

11. A drawing-out device as set forth in claim 10, wherein the bearing blocks are formed as flat stone-like body.

12. A drawing-out device as set forth in claim 8, wherein each of the stationary, drawing-out and at least partially displaceable rails is formed of two U-shaped rail sections having the webs thereof abutting each other, wherein each of the bearing blocks has a U-shape and is pinned up on the abutting each other webs of the U-shaped rail sections of a respective rail, with the webs being located between legs of the bearing block, and with an axle-journal-receiving bore being provided in each leg of the bearing block, and wherein the webs of the abutting each other U-shaped rail sections have bores congruent with the bores provided in the legs of the bearing block.

13. A drawing-out device as set forth in claim 1, wherein the device comprises both the pair of stationary rails and the pair of at least partially displaceable rails, wherein the partially displaceable rails define intermediate rails located, respectively, between a respective stationary rail and the drawing-out rail, wherein each of the intermediate rails carries one of the running rollers at a front, in a drawing-out direction, end thereof and one of the running rollers at a rear, with respect to the drawing-out direction, and thereof, wherein the roller carried at the front end projects beyond an upper flange of the intermediate rail, and the roller carried at the rear end projects beyond a lower flange of the intermediate rail.

14. A drawing-out device as set forth in claim 13, wherein the intermediate rails are connected by a transverse bar located beneath the drawing-out rail.

15. A drawing-out device as set forth in claim 1, wherein the rails of the at least one of a pair of stationary rails and a pair of at least partially displaceable rails likewise have a I-shaped cross-section, and wherein the I-shape of the drawing-out rail and the rails of the at least one of a pair of stationary rails and a pair of at least partially displaceable rails is formed of two U-shaped sections having their webs abutting each other.

16. A drawing-out device as set forth in claim 15, wherein the running rollers have each a cylindrical running surface having at least one circumferential groove, and wherein cheeks of the u-shaped sections have beads formed thereon for form-lockingly engaging into the groove of respective rollers.

17. A drawing out device as set forth in claim 15, further comprising bearing blocks for mounting respective running rollers on respective rails, wherein the U-shaped sections forming the respective rails and the respective bearing blocks have cooperating grooves and beads for form lockingly connecting the respective bearing blocks with respective U-shaped section.

18. A drawing-out device as set forth in claim 1, wherein the device comprises both the pair of stationary rails and the pair of at least partially displaceable rails, wherein the partially displaceable rails define intermediate rails located, respectively, between a respective stationary rail and the drawing-out rails, and wherein the running rollers include a pair of rollers supported by the intermediate rails and a pair of rollers supported by the stationary rails, respectively.

19. A drawing-out device as set forth in claim 1, wherein the I-shaped section has a height equal at least 50 mm.

20. A drawing-out device as set forth in claim 1, wherein the running rollers have cylindrical running surfaces, wherein the device further comprises bearing blocks for mounting the running rollers on respective rails, and guide rollers having vertical axes and arranged in respective bearing blocks, the guide rollers engaging respective end surfaces of horizontal flanges of respective rails.

21. A drawing-out device as set forth in claim 1, wherein the rails of the at least one of a pair of stationary rails and a pair of partially displaceable rails likewise have an I-shaped cross-section.

22. A drawing-out device as set forth in claim 1, wherein outer sides of flanges of the I-shaped drawing-out rail has undercut grooves for engaging respective connection elements.

* * * * *